3,367,885
HYDROCARBON CONVERSION CATALYSTS
Jule A. Rabo, Armonk, and Paul E. Pickert, North Tonawanda, N.Y., and James E. Boyle, Palos Verdes Peninsula, Calif., assignors to Union Carbide Corporation, a corporation of New York
No Drawing. Continuation-in-part of application Ser. No. 172,070, Feb. 7, 1962. This application Feb. 21, 1966, Ser. No. 528,816
15 Claims. (Cl. 252—455)

ABSTRACT OF THE DISCLOSURE

A hydrocarbon conversion catalyst having improved isomerization activity and selectivity is prepared by: (a) providing a large pored high silica molecular sieve composition, (b) exchanging >40% of its cations with non-metallic easily decomposable cations, (c) introducing a catalytically active metal, (d) heating the resulting composition to decationize the molecular sieve, (e) cooling, partially rehydrating and equilibrating the decat. MS to contain 3–10 wt. percent $H_2O$, and (f) slowly reheating to 300°–700° C. The invention also relates to a process for isomerizing paraffin hydrocarbons by contacting with the above described catalyst under isomerizing conditions.

---

This application is a continuation-in-part of application Ser. No. 172,070 filed Feb. 7, 1962, now U.S. Patent No. 3,236,761, which in turn is a continuation-in-part of application Ser. Nos. 862,764 and 862,989 both filed Dec. 30, 1959 in the names of Jule A. Rabo et al. Ser. No. 862,989 has been abandoned and Ser. No. 862,764 issued Apr. 21, 1964 as United States Patent No. 3,130,006.

This invention relates to a hydrocarbon conversion process and to a catalyst therefor. More particularly, this invention relates to a method for preparing an improved zeolitic molecular sieve catalyst for hydrocarbon conversion reactions generally considered as proceeding through carbonium or ionic type intermediates, especially isomerization. Other suitable conversions which include isomerization as an integral part are for example alkylation, reforming, hydrocracking and polymerization.

Hydrocarbon conversion and the isomerization of hydrocarbons in particular is of special importance to the petroleum industry. In recent years, with the advent of high horsepower gasoline-driven internal combustion engines, a need has arisen for higher octane number gasolines. Natural straight-run gasolines, i.e., naphthas, contain chiefly, normal paraffins, such as normal pentane and normal hexane, which have relatively low octane numbers, i.e., too low for modern high power requirements. It has become essential, therefore, to convert these low octane components to their higher octane counterparts. The isomerization of these hydrocarbon components accomplish this conversion, i.e., the isomers resulting have a much higher octane rating. Hence, the facility with which this isomerization is accomplished has become of prime importance.

Formerly, straight-run naphtha of low octane quality was used directly as motor gasoline. However, with the above-described need for higher-octane gasoline arising, attempts were made at thermally rearranging or reforming the naphtha molecules for octane number improvement.

"Reforming" is the term employed by the petroleum industry to refer to the treatment of gasoline fractions having a boiling range above about 90° C. to obtain higher octane ratings and improved "antiknock" characteristics through the formation of aromatic as well as branched chain hydrocarbons. The thermal reforming of gasoline proved to be inadequate and catalytic reforming in a hydrogen-rich atmosphere, in large part, was substituted therefor by the gasoline industry.

In this regard, also, to permit full use to be made of tetraethyl lead (which is less effective with aromatics than with paraffins), high octane paraffins must be incorporated in gasoline blends. Such high octane paraffins can only be obtained from alkylation (which may require butane isomerization) or from the isomerization of pentanes, hexanes, or other light straight-chain hydrocarbons.

Among the isomerization processes known in the art, the most recent have dealt with converting normal paraffins, such as pentane and hexane, to their branch-chain counterparts by contacting, in the presence of hydrogen, the straight-chain hydrocarbons at an elevated temperature and pressure with a reforming type solid catalyst. U.S. Patent 2,831,908 and British Patent 788,588 relate to such processes. In each of the processes disclosed in these patents, however, a corrosive activator, such as a halide, is employed in the catalyst. Moreover, neither of these processes can be used for isomerizing a mixture of n-pentane and n-hexane with a high degree of efficiency.

The catalysts employed for the reforming of gasoline fractions boiling above 90° C., to higher octane products also employ acidic halide activators of objectionably corrosive nature.

It is known in the art to improve the quality of hydrocarbons, particularly petroleum hydrocarbons, by contacting them at various operating conditions with catalysts to effect the above-mentioned hydrocarbon conversions. Heretofore, only strong mineral and Lewis-type acids have been found to be effective as catalysts for alkylation activity. Many difficulties have been encountered because of the corrosive nature of these strong acid catalysts thereby limiting the operating conditions of the conversion process.

An object of the present invention is to provide an improved process and catalyst for hydrocarbon conversion.

Another object of the present invention is to provide improved process and catalyst for conversions proceeding through carbonium-type intermediates, including isomerization, alkylation, reforming, hydrodealkylation, catalytic cracking and polymerization.

Other objects and advantages of the present invention will be apparent from the ensuing description and appended claims.

According to the present invention, a method is employed for preparing an improved hydrocarbon conversion catalyst in which a metal cation-containing zeolite molecular sieve composition is provided having a crystalline structure capable of internally adsorbing benzene, and also having a silicon dioxide to aluminum trioxide molar ratio greater than 3.0. The cations of this composition are exchanged with sufficient nonmetallic, easily decomposable cations so that more than 40 percent of the aluminum atoms become associated with such nonmetallic cations. A catalytically active metal is introduced to the molecular sieve composition, either before or after the nonmetallic cation exchange. Next the catalytically active metal-containing nonmetallic cation-containing molecular sieve composition is heated to temperature above 350° C. and below the crystal destruction temperature to decompose the nonmetallic cations and form a decationized molecular sieve.

The decationized composition is cooled, partially rehydrated and equilibrated so as to contain between 3 and 10 weight percent water. The resulting composition is slowly heated to temperature between 300° C. and 700° C. and preferably for sufficient duration to reduce the water loading below 2½ weight percent. The finished catalyst is then used directly for hydrocarbon conversion or stored in a sealed container until needed. In any event it is desirable to isolate the finished catalyst from the atmosphere to avoid further rehydration.

The term "zeolite," in general, refers to a group of naturally occurring hydrated metal aluminosilicates, many of which are crystalline in structure. However, a number of synthetic crystalline zeolites have been prepared. They are distinguishable from each other and from the naturally occurring material, on the basis of their composition, their crystal structure and their adsorption properties. A suitable method for describing the crystal structure, for example, is by their X-ray powder diffraction patterns.

Crystalline zeolites structurally consist basically of an open three-dimensioned framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal, of cations, e.g., alkali metal or alkaline earth metal cations. This balance may be expressed by the formula $$2Al/(2Na, 2K, 2Li, Ca, Ba, Sr, etc.) = 1 \pm 0.15$$

Moreover, it has been found that one cation may be replaced by another by suitable exchange techniques. Consequently, crystalline zeolites are often employed as ion-exchange agents. The cations are located in the vicinity of the $AlO_4$ tetrahedra, but their exact location depends on the valency and the size of the cations. The replacement of the cations with other electropositive cations does not induce appreciable changes in the anionic framework. Therefore, any particular zeolitic molecular sieve can be identified independent of the type of cation it contains by the X-ray diffraction pattern and its other chemical components.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." As stated heretofore, the novel hydrocarbon conversion processes with which this invention is concerned, has, as one of its essential features, the utilization therein of a novel zeolitic catalyst having the general structure also set forth above.

As previously indicated, a zeolitic molecular sieve is utilized as the novel catalyst for the improved hydrocarbon conversion process. It has been discovered that the catalytic activity of the zeolite employed is strongly dependent on (1) the pore size, (2) crystallinity, (3) the silica-to-alumina molar ratio and (4) the amount of decationization in the structure. It has also been discovered that the catalytic activity is substantially affected by the method in which the molecular sieve is activated, and in particular by its state of hydration.

The pore size is important to the catalytic activity in that it must be larger than the molecules of the feed and the product. The molecules should be admitted and desorbed freely from the structure. Therefore, in hydrocarbon conversion processes only large pore size molecular sieves able to internally adsorb benzene are practical. The pore size can also be defined as one large enough to admit a substantial amount of branched-chain $C_4$ to $C_{10}$ hydrocarbons and to release their structurally rearranged counterparts or isomers.

The term "decationized" relates to that unique condition whereby a substantial amount, i.e., at least 10 percent of the aluminum atoms of the aluminosilicate structure are not associated with any cations. Another way of expressing "decationization" is that condition whereby less than 90 percent of the aluminum atoms of the aluminosilicate structure are associated with cations. For purposes of this invention the finished molecular sieve catalyst is more than 40 percent decationized so that less than 60 percent of the aluminum atoms are associated with cations. The decationization of the novel catalysts of this invention may be accomplished by ion-exchanging the alkali metal cations of the zeolite with ammonium ions or other easily decomposable cations such as methyl or other substituted quaternary ammonium ions, and then heating the ammonium exchanged zeolite to temperatures of between about 350° C. and about 600° C. While the exact mechanism of the decationization process is not fully understood, the following equation showing the decationization of an ammonium cation exchanged zeolitic molecular sieve can be taken as illustrative:

$$(NH_4^+)Y \longrightarrow (H^+)Y + NH_3$$

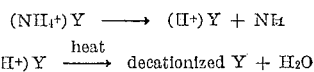

It is noted that water is evolved in the second equation of the decationization process. This water is believed to be constituted of hydrogen from the cation sites and an equivalent amount of oxygen released from the aluminosilicate framework. That the crystal structure does not collapse when this oxygen is removed is surprising. It is believed that this stability is attributable to the silica-to-alumina ratio of greater than 3. The process for producing this decationized zeolitic molecular sieve is more fully described in our U.S. patent application Serial No. 862,764 filed December 30, 1959 now U.S. Patent 3,130,006.

For best catalytic results, the degree of decationization should be at least 40 percent and preferably above about 65 percent. It is to be observed that at the preferred degrees of decationization of our catalyst the low silica-to-alumina ratio molecular sieves, such as zeolite X which is described in U.S. Patent No. 2,882,244, lose their crystallinity and the uniformity of their pore openings whereas molecular sieves having silica-to-alumina ratios above 3, such as zeolite Y, retain their crystallinity even when fully, i.e., 100 percent, decationized.

The crystallinity of the zeolite strongly influences catalytic activity. Zeolite catalysts having crystalline structures are more active than the non-crystalline zeolites with the same chemical composition. The catalytic hydrocarbon reaction occurs at high temperatures. Hence, the crystal structure of the catalyst should be heat stable at the reaction temperature. In this regard, silica-alumina ratios greater than 3 have been found to improve heat stability.

The catalytically active metal, especially metals of Group VIII such as platinum or palladium, is preferably provided in finely-dispersed catalytic amounts, that is, 0.05 to 2.0 weight percent of the finished catalyst. For best results, amounts of 0.2–0.6 weight percent of the Group VIII noble metals are employed. It should be noted, however, that the presence of the metal in amounts higher than 2.0 percent will also enhance the conversion of hydrocarbons. However, it has been found that the use of more than 2.0 percent of the metals such as the noble metals does not substantially enhance catalytic activity and hence is superfluous as well as exorbitantly expensive. The catalytically active metals may be dispersed upon the molecular sieve in their elemental state or as oxides or compounds having catalytic properties. Among the metals and their oxides which have hydrocarbon conversion activity are copper, silver, gold, zinc, cadmium, titanium, tin, lead, vanadium, antimony, bismuth, chromium, molybdenum, tungsten, manganese, rhenium, iron, cobalt, nickel and the noble metals of the palladium and platinum groups.

It has been discovered that, although the compositions prepared by the present invention exhibit catalytic activity for all hydrocarbon conversion processes, they show unexpectedly improved results in certain specific conversion processes characterized as proceeding through the carbonium or ionic type mechanism as distinguished from the radical-type mechanism. Included in such processes are: isomerization, reforming, hydrocracking, alkylation and dealkylation. The preferred metals are palladium and platinum, particularly palladium because of its lower cost and comparable activity.

The catalytically active metals may be introduced to the crystalline aluminosilicate by any method which will result in the attainment of a highly dispersed catalytically active metal. Among the methods which may be employed are (1) impregnation using an aqueous solution of a suitable metal compound followed by drying and thermal or chemical decomposition of the metal compound; (2) adsorption of a fluid decomposable compound of the metal compound: (3) cation exchange using an aqueous solution of a suitable metal salt followed by chemical reduction of the cations; (4) cation exchange using an aqueous solution of a suitable metal compound in which the metal is in the cationic state with coordination complexing agents followed by thermal or chemical decomposition of the cationic complex. Methods 1, 2 and 3 are conveniently employed to introduce metals such as copper, silver, gold, cadmium, iron, cobalt and nickel while Methods 1, 2 and 4 are suitable for introducing the platinum and palladium group metals. Method 2 is suitable for introducing metals such as titanium, chromium, molybdenum, tungsten, rhenium, manganese, zinc and vanadium. The metal loading techniques of Methods 2, 3 and 4 are preferred as the resulting products exhibit higher catalytic activity than those produced by Method 1. The ion exchange techniques of Methods 3 and 4 are particularly advantageous since their products have exhibited the highest catalytic activities. Methods 2, 3 and 4 are preferred because of the deposition of the active metal throughout the inner adsorption area of the molecular sieve, the most active dispersion being achieved by Methods 3 and 4.

The impregnation Method 1 may be practiced in any way that will not destroy the essential structure of the crystalline zeolitic aluminosilicate. Impregnation differs from the other loading methods of this invention in that the metal is commonly in the anionic part of a water soluble compound and thus is only deposited on the external surfaces of the zeolite. In preparing the catalyst, a water soluble compound of the metal, such as a Group VIII metal, in an amount sufficient to contain the quantity of metal desired in the finally prepared catalyst product is dissolved in water and mixed with the crystalline zeolite. The zeolite is then dried and heated to a temperature sufficient to thoroughly remove the water leaving the metal of the compound in a uniform deposit. Further heating may in some instances be required to convert the metal to its active state, such as heating in hydrogen or other reducing atmospheres.

Method 2 provides a means for depositing the active metals in the inner adsorption region of the molecular sieves. The zeolite is first activated to remove any adsorbed water and then contacted with a fluid decomposable compound of the metal thereby adsorbing the compound into the sieve. Typical of such compounds are the metal carbonyls, metal alkyls, volatile metal halides and the like. The internally adsorbed compound is then reduced thermally or chemically to its elemental metal thus leaving an active metal uniformly dispersed throughout the internal adsorption region of the molecular sieve.

It is preferred that the zeolitic crystalline aluminosilicate be ammonium ion-exchanged to the desired degree prior to the impregnation step or adsorption step, depending on the method in use, for the reason that some removal of the already deposited metal compound would result if the ammonium ion-exchange was accomplished after these steps. In order to effect the best distribution of the metal compound on the catalyst, the aqueous solution of the metal compound in the impregnation method should be as concentrated as practical. To this end the best results are obtained if at least some of the water contained in the inner pores of the ammonium ion-exchanged zeolite has been removed prior to mixing with the impregnation solution. Such removal is effected by heating to about 125° C. Temperatures up to 200° C. may be employed for this drying and will effect a more complete removal of the water.

As stated above the solution should be as concentrated as practical commensurate with achieving a uniform distribution of the metal compound on the zeolite. Practical quantities of water are in the range by weight of the zeolite from about 30 percent to 100 percent. Less than 30 percent will not wet zeolite thoroughly enough to distribute uniformly and over 100 percent will allow some solution to run-off with resultant loss of metal compound. About 60 weight percent has been found to produce good results. The thus impregnated zeolite may then be dried by heating to about 125° C. to evaporate enough of the water so that a powder product is obtained which may easily be pelletized in a conventional pellet press. The product may be then stored and the activation process requiring high temperature, and sometimes hydrogen treatment, may be effected when the pellets have been installed in the reaction chamber for use. The activation method is discussed hereinafter.

The ion-exchange Methods 3 and 4 differ since 3 relates to the use of metal salts such as the chlorides and nitrates of the iron group metals, wherein the metal itself is the cation, whereas 4 relates to the use of compounds of metals, such as the platinum and palladium group metals, in which the metal is contained in the cationic portion of the compound in coordination complex form.

The ion-exchange may be practiced in standard fashion, i.e., the metal compound is dissolved in an excess of water in an amount calculated to obtain the desired amount of metal in the catalyst product. This solution is preferably then added to the previously ammonium exchanged zeolite with stirring and after a sufficient time has elapsed to allow the ion-exchange to take place the exchanged zeolite is separated by filtration. The ion-exchange of the active metal containing cations into the zeolite is substantially quantitative and the completeness of the exchange process can be detected by chemical tests for the metal in a sample of liquid from the exchanging solution. The filtered zeolite may then be washed to the extent necessary to remove any residual occluded salts followed by drying to produce a pelletizable powder. Decomposition of the active metal containing cation is effected by heating to above 300° C. and preferably above 400° C. When the metal employed is of the iron group, it is preferred to conduct this operation in a reducing atmosphere such as provided by hydrogen, methane or carbon monoxide while in the case of the noble metals air may be employed. This is preferably done after the powder has been pelletized, since if it is done beforehand it becomes necessary to perform the pelletizing operation in a dry atmosphere to avoid rehydration beyond the extent that is preferred as discussed hereinafter.

The better catalytic activity shown by the metals introduced in the crystalline zeolite by ion-exchange rather than impregnation is believed due to the greater dispersion of the metal within the inner adsorption region of the crystalline zeolite achievable with ion-exchange techniques. It is believed that the metal introduced by ion-exchange techniques is dispersed throughout the crystalline zeolite in essentially atomic dispersion.

As aforementioned, an ion-exchange of from 40 to 100 percent of the metallic cations by non-metallic cations and the subsequent thermal decationization thereof is necessary. The results obtained thereby are extremely significant when compared with lesser decationization. In other words, the decationized catalytic form is more effective when at least 40 percent of the aluminum atoms are not associated with cations and most effective above 65 percent.

It should be emphasized that the present catalyst, unlike those of the prior art, does not employ the usual corrosive halide activators, i.e., such as chlorine, fluorine, etc. to enhance its activity. Moreover, the present catalyst is water-resistant under the reaction conditions set forth above. This feature is a direct result of the avoidance of halide activators. If halide activators were present in the catalyst, by adding water, corrosive hydrogen chloride or hydrogen fluoride would be formed and would leave the catalyst. Water amounts up to 1000 parts per million in the hydrocarbon feed, however, are tolerable for short periods of time to the catalyst of the present invention. In the prior art, on the other hand, the water in the feed had to be below 20 parts per million. Hence, the feed in the prior art had to be thoroughly dried before use. This feature is completely avoided by the process of the present invention. It should be emphasized, however, that under certain conditions activators may be employed in the process of this invention. However, even without the use of activators the equilibrium in the isomerization of the hexane and pentane fractions can be approached with facility.

Among the crystalline zeolites which have been found to be useful in the practice of the present invention, zeolite Y, zeolite L, and faujasite are the most important. The chemical formula for zeolite Y expressed in terms of mole oxides may be written as:

$$0.9 \pm 0.2 Na_2O : Al_2O_3 : xSiO_2 : yH_2O$$

wherein $x$ is a value greater than 3 up to about 6 and $y$ may be a value up to about 9.

Zeolite Y has a characteristic X-ray powder diffraction pattern which may be employed for identification. Zeolite Y is described in U.S. Patent No. 3,130,007, and the description therein is incorporated herein by reference.

Zeolite L may be identified and distinguished from other zeolites and other crystalline substances by its X-ray powder diffraction pattern, the more significant $d(A)$ values, i.e., interplanar spacings being listed below in Table A.

*Table A*

| | |
|---|---|
| 16.1±0.3 | 3.17±0.01 |
| 7.52±0.04 | 3.07±0.01 |
| 6.00±0.02 | 2.91±0.01 |
| 4.57±0.04 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

The composition of zeolite L may stoichiometrically be expressed in terms of mole ratios of oxides. Thus, a general formula for zeolite L may be represented as follows:

$$0.9\text{-}1.3 M_{2/n}O : Al_2O_3 : 5.2\text{-}6.9 SiO_2 : yH_2O$$

wherein M designates at least one exchangeable cation, as hereinbelow defined; $n$ represents the valence of M; and "y" may be any value from 0 to about 9. The exchangeable cations include mono-, di-, tri-, and tetravalent metal ions, particularly those of Groups I, II, and III of the Periodic Table, as set forth in Webster's New Collegiate Dictionary, 1956 edition, page 626, such as barium, calcium, cerium, lithium, magnesium, potassium, sodium, zinc ions etc. and the like, and other cations, for example, hydrogen and ammonium ions, which with zeolite L behave like the metal ions mentioned above in that they may be replaced for other exchangeable cations without causing a substantial alteration of the basic crystal structure of the zeolite. Although there are a number of cations that may be present in zeolite L, it is preferred to synthesize the potassium form of the zeolite, i.e., the form in which the exchangeable cations present are substantially all potassium ions. Zeolite L is described more completely in U.S. Patent No. 3,216,789, incorporated herein by reference.

It will now be apparent that the starting molecular sieve material for the practice of this invention contains some metal cations, as for example sodium. This molecular sieve may contain some polyvalent cations as in the case of the naturally occurring faujasite, or even nonmetallic cations. In any event, sufficient exchange is effected with nonmetallic easily decomposable cations, preferably dissolved in an aqueous solution, so that more than 40 percent of the aluminum atoms of the molecular sieve become associated with such non-metallic cations.

As previously indicated, the molecular sieve composition containing more than 40 percent non-metallic cations and also containing a catalytically active metal is heated to above 350° C. and below the crystal destruction temperature of the molecular sieve. The latter limit depends primarily on the percent exchange with non-metallic cations, e.g. hydrogen or ammonium. If the exchange is about 40 to 60% the composition may be heated up to about 900° C. without losing its structural integrity. However, if greater than about 80% of all the structural metallic cations are replaced by nonmetallic cations, the composition should not be heated above 600° C. to avoid partial destruction of crystallinity.

The purpose of this first heating step is to remove the composition's water of hydration. It is, however, preferable to remove the water from the molecular sieve as soon as it is desorbed. The heating step may be performed in a vacuum or an inert atmosphere, but preferably in an oxygen-containing environment such as air for maximum activity in the finished catalyst. The purpose of this step is to both dehydrate the molecular sieve and also to decompose the nonmetallic cations to the extent that the sieve becomes more than 40% decationized. The first heating step is also preferably effected in a dry atmosphere to avoid the undesirable hydrothermal effects of water on molecular sieves at high temperature.

Next the decationized molecular sieve composition is cooled, partially rehydrated and equilibrated so as to contain between 3 and 10 weight percent water. Less than 3 percent water is not sufficient to coat the molecular sieve composition and thus provide a finished catalyst with full crystallinity, high conversion activity and isomerization product selectivity. The dehydrated molecular sieve from the first heating step may contain about 2 weight percent water, so that at least 1 percent water is added by the partial rehydration step. On the other hand, full crystallinity of the finished catalyst may not be retained on the subsequent second heating dehydration step if the partial rehydration exceeds 10 weight percent water.

The reasons for the superior performance of a catalyst prepared by this invention are not fully understood, but a possible explanation is that each molecule of $H_2O$ may react with two oppositely charged alumina tetrahedra in the molecular sieve. For example, calculations have shown that an 85% decationized zeolite Y with a $SiO_2/Al_2O_3$ mol ratio of about 5.0 would require rehydrating to 3.5 weight percent $H_2O$ for this stoichiometric reaction. This reaction would correspond to reversal of the dehydration that is believed to occur when a proton from one $AlO_4^-$ tetrahedron and an $OH^-$ from another $AlO_4^-$ tetrahedron is split away from the protonated unstable intermediate formed during decomposition of the nonmetal cations, e.g. ammonium. However, if an undissociated molecule of water reacts with each decationized alumina tetrahedron, a calculated loading of 6.7 weight percent $H_2O$ would be required. One complicating feature in such reasoning is that previous experiments have indicated that each alumina tetrahedron in the zeolitic molecular sieve is not equivalent.

It has been found that full rehydration (20–25 weight percent water) of the decationized molecular sieve, e.g. zeolite Y, followed by reactivation results in considerable loss in X-ray diffraction peak-heights and in adsorption capacity. Accordingly, the catalytic activity and isomerization selectivity of such compositions would be substantially lower than the finished catalyst prepared by the instant invention.

To achieve this improved catalyst, it is essential that the water introduced during the partial rehydration step be substantially uniformly distributed through the mass of the zeolitic molecular sieve mass. That is, the mass must be equilibrated with respect to the water. This may be accomplished either as an integral portion of the partial dehydration step or as a separate succeeding step. For example, if the decationized molecular sieve composition is thereafter cooled to ambient temperature, equilibration may be achieved by moderate heating to perhaps 80° C. during the partial rehydration to accelerate the movement and diffusion of water through the zeolite mass. Alternatively the partial rehydration may be performed at ambient temperature by for example exposing the decationized molecular sieve to the atmosphere for sufficient duration to achieve the desired water loading. At this point the mass is stored in a sealed atmosphere, e.g. container, for sufficient duration to realize substantially uniform distribution of water by natural convection. A third suitable method is simultaneous partial rehydration and equilibration by contacting with gas containing sufficient water for adsorption to establish equilibrium at a selected temperature between the gas and decationized molecular sieve such that the latter's concentration is in the desired 3–10 weight percent water range.

Following the partial rehydration and equilibration, the decationized molecular sieve composition is slowly reheated to temperature between 300° C. and 700° C. and preferably for sufficient duration to reduce the water loading below 2½ weight percent. As used herein, "slow heating" means rates less than about 75° C. per hour. If heating is too fast, the molecular sieve's crystallinity, catalytic activity and isomerization selectivity are reduced. Accordingly, slow heating also means below which these desired characteristics are impaired.

This final reheating step is preferably in a hydrogen atmosphere to insure reduction of the catalytically active metal to its most active, i.e. elemental state.

One particularly suitable activation procedure for this catalyst involves the following steps:

(1) The catalyst should be heated slowly in air at 300° C. to 600° C. and preferably at 500° C.

(2) The catalyst should then be heated slowly from room temperature to about 500° C. in a stream of hydrogen gas at atmospheric pressure.

The temperature may be held at about 500° C. for several hours for maximum benefit; the temperature should then be reduced to the hydrocarbon process temperature, adjusting the pressure in the reactor to establish the conditions recommended for conversion. Hydrogen flow-rate during activation should be about 2 liters of gas at N.T.P., per cubic centimeters of catalyst per hour. A typical temperature program for activation is shown below in Table B.

*Table B*

| Temperature, ° C.: | Time, hours |
|---|---|
| Room temp. to 80 | 1 |
| 80 to 120 | 2 |
| 120 to 150 | 1 |
| 150 to 200 | 1 |
| 200 to 250 | 1 |
| 250 to 300 | 1 |
| 300 to 350 | 2 |
| 350 to 500 | 1 |
| 500 | 16 |
| Total | 26 |

For example, the pretreatment of a 0.5 percent platinum loaded decationized zeolite Y molecular sieve isomerization catalyst has been found to be particularly critical. For the complete activation of this catalyst prior to its use for isomerization, the following steps were employed: The catalyst was prepared from a sodium Y zeolite in which approximately 80 percent of the sodium cations were exchanged to ammonium cations prior to metal cation exchange. The first step involved the fixation of the noble metal, e.g. platinum, and the thermal loss of ammonium ion by firing a pelletized catalyst in air. The second step consisted of firing the pellets in an atmosphere of dry hydrogen. Between these two steps, after the air firing, the catalyst was allowed to cool and partially rehydrate prior to the hydrogen treatment. In the hydrogen firing, two variables appear to be significant. These are the rates of heating and the temperature at which the catalyst is heated. In addition, it was noted that rehyrdation to a water content of about 3 to 10 weight percent gave maximum results for the isomerization of normal hexane.

As can be seen therefore, the step of rehydration, followed by heating to about 500° C. has been found to be desirable to obtain the best balance between isomerization and cracking activities.

This reheating step should not exceed 700° C. as higher temperatures produce sintering of the catalytically active metal. This involves migration of such metal to a greater mass and reduces the effectiveness of such metal as a catalyst.

It will be apparent from the foregoing explanation that the water loading of the molecular sieve composition is reduced at least 0.5 weight percent during the reheating step, and that the amount of water removed depends on the reheat temperature. It is of course desirable to employ dry gas, e.g. hydrogen, for contact with the molecular sieve mass during reheat, and for maximum water removal the gas discharged from the mass at the highest reheat temperature should contain less than 10 p.p.m. water.

The invention will be more clearly understood by a reading of the ensuing examples.

EXAMPLE I (a) *Preparation of a decationized molecular sieve zeolite*

A 22 liter, 3-necked glass flask, equipped with a mechanical stirrer, reflux condenser, and thermometer, and heated by means of a heating mantle, was charged with 12 liters of distilled water and 4400 grams of ammonium chloride. The temperature was raised to 30° C. to dissolve all of the ammonium chloride. To this stirred solution there was charged 6000 grams of a sodium Y molecular sieve zeolite (containing 23 equivalents of sodium cations), having the following compositions:

|  | Found, Percent by Weight | Calculated to Anhydrous Basis, Percent |
| --- | --- | --- |
| Na₂O | 8.8±0.3 | 11.8 |
| Al₂O₃ | 16.6±0.5 | 21.1 |
| SiO₂ | 48.7±0.5 | 65.0 |
| Loss on ignition (H₂O) | 25.1±0.3 | |

Calculated molar ratios: SiO₂:Al₂O₃, 5.0; Na₂O:Al₂O₃, 0.88.

Surface area of the sodium zeolite Y following a Braunauer, Emmett, Teller method for determining the surface area of a molecular sieve using nitrogen adsorption was found to be 532 meters²/gram of molecular sieve.

The resulting slurry was then heated to a reflux temperature (106° C. to 110° C.), held for three hours, and filtered with suction. Analysis of a portion of this material, after thorough washing, showed the Na₂O content to be 4.1 weight percent on an anhydrous basis.

The filtered material was then re-slurried in the same quantity of ammonium chloride solution and the procedures repeated. Analysis showed the Na₂O content to be 3.2 percent. The procedures were then repeated on the twice-exchanged filtered material. The three-times exchanged zeolite was then slurried in approximately 5 gallons of distilled water and pumped into a filter press.

An additional 10 gallons of distilled water were pumped through the material to remove soluble salts until the removed water gave a negative test for chloride ions with a silver nitrate reagent. The washed material was then dried at 125° C. and the precipitate was broken up mechanically and allowed to re-equilibrate with the water vapor of the air. The material had the following analysis:

|  | Found, Weight Percent | Calculated to Anhydrous Basis, Weight Percent |
| --- | --- | --- |
| Na₂O | 1.8±0.1 | 2.4 |
| (NH₄)₂O | 7.1±0.2 | 9.45 |
| Al₂O₃ | 17.9±0.5 | 23.8 |
| SiO₂ | 51.5±0.5 | 68.7 |

Calculated Molar Ratios: SiO₂:Al₂O₃, 4.92; Na₂O:Al₂O₃, 0.165; (NH₄)₂O:Al₂O₃, 0.78.

(b) *Pt(NH₃)₄⁺² ion exchange of the above material*

In a 22-liter, 3-necked flask, equipped with a mechanical stirrer and dropping funnel, there was charged 5,400 grams of the material prepared above and 7 liters of distilled water. (The percent solids content of this material at the start of this preparation was found to be 67.6 percent=32.4 percent loss on ignition. Therefore, the weight of zeolite minus water and ammonia charged was 3,650 grams.) To this stirred slurry a 7-liter volume of aqueous solution of Pt(NH₃)₄Cl₂—H₂O was added slowly, from the dropping funnel. The platinum compound employed contained 56.2 percent±0.4 platinum by analysis.

A total of 33.0 grams of Pt(NH₃)₄Cl₂—H₂O which is equivalent to 0.5 weight percent Pt on the zeolite product was employed.

The rate of addition of the solution of $$Pt(NH_3)_4Cl_2—H_2O$$

was 1.4 liters per hour.

When addition of the Pt(NH₃)₄Cl₂—H₂O solution was complete, stirring was continued for 16 to 17 hours. The slurry was then filtered with suction. The filtered material was reslurried in 6 liters of distilled H₂O and filtered by suction and washed. This procedure was again repeated. The filtrate, after the second washing, gave a negative test for Cl⁻ with AgNO₃ reagent. The filtered material from the second washing was dried in an oven at 125° C. granulated by forcing through a U.S. Standard 20 mesh screen, and converted into tablets in a pellet press. The size of the tablets formed were ³⁄₁₆-inch in diameter and ¹⁄₁₆-inch thick. The weight of the tablets was 4,640 grams (25.5 weight percent loss on ignition=3,560 grams solids). The volume was 5,900 cc. Approximately 111,000 tablets were formed.

The following analytical results were obtained.

|  | Found, Weight Percent | Calculated to Anhydrous Basis, Weight Percent |
| --- | --- | --- |
| Pt | 0.37±0.2 | 0.46 |
| Cl⁻ | 0.03±0.02 | |
| Na₂O | 1.9±0.2 | 2.34 |
| (NH₄)₂O | 7.3±0.1 | 9.0 |
| Al₂O₃ | 18.3±0.4 | 20.6 |
| SiO₂ | 53.1±0.5 | 65.5 |
| LOI | 26.2±0.4 | |

SiO₂:Al₂O₃ molar ratio=4.90.
Surface Area—510 m.²/g.

(c) *Activation (decationization) of above Pt(NH₃)₄⁺² exchanged NH₄⁺-exchanged Y molecular sieve*

A total of 1,775 grams (2,200 cc.) of the above tablets were placed in an electric oven set to control at 550° C. Approximately 3 hours was required to bring the sample temperature to 500–520° C. This temperature was maintained for an additional 5 hours. The fired tablets were then removed and allowed to re-equilibrate with the water vapor of the air overnight. The weight was 1,430 grams, volume=1,950 cc. The percentage of solids was determined by loss on ignition at 750° C. for the rehydrated pellets and was found to be 91.3 percent.

A small sample of the fired tablets was fully rehydrated and submitted for analysis:

|  | Found, Weight Percent | Calculated to Anhydrous Basis, Weight Percent |
| --- | --- | --- |
| Na₂O | 2.1 ±0.1 | 2.6 |
| Al₂O₃ | 20.2 ±0.3 | 24.8 |
| SiO₂ | 58.8 ±0.3 | 72.0 |
| LOI | 18.3 ±0.3 | |
| Pt | 0.41±0.05 | 0.5 |
| Cl | <0.05 | |
| N | <0.3 | |

SiO₂:Al₂O₃ molar ratio=4.95.
B.E.T.—N₂ Surface Area—416 m.²/g.

EXAMPLE II

*Preparation of 1.0 weight percent platinum loaded NH₄Y*

In a 3 liter, 3-necked flask equipped with a mechanical stirrer and dropping funnel, there was charged 150 grams of the material as prepared in Example I(a). The percent solids content of this material at the start of this preparation was found to be 78.0 percent which equaled a 22.0 percent loss on ignition. Therefore, the weight of zeolite minus water and ammonia charged was 117 grams and 600 mls. of distilled water. To this stirred slurry an aqueous solution of Pt(NH₃)₄Cl₂·H₂O in 600 mls. of water was added slowly from the dropping funnel.

A total of 2.108 grams of Pt(NH₃)₄Cl₂·H₂O to be equivalent to 1.0 weight percent Pt on the final product was employed.

The rate of addition of the solution of $$Pt(NH_3)_4Cl_2 \cdot H_2O$$

was 600 mls. per 1.5 hours.

When addition of the Pt(NH₃)₄Cl₂·H₂O solution was complete, stirring was continued for two (2) hours. The slurry was then filtered with suction. The filter material was reslurried in 500 mls. of distilled water and filtered by suction. This procedure was again repeated. The filtrate after the second washing, gave a negative test for Cl⁻ with AgNO₃ reagent. The filter material from the second washing was dried in an oven at 125° C., granulated by forcing through a U.S. Standard 20 mesh screen and converted into tablets in a pellet press. To improve the physical characteristic of the pellets, catalytically inert material may be added.

EXAMPLE III

*Preparation of a 0.5 weight percent Pd loaded NH₄Y*

In a 5 liter, 3-necked flask, equipped with a mechanical stirrer and dropping funnel, there was charged 422 grams of the material as prepared in Example I(a) into 2 liters of water. The percent solids content of this material at the start of this preparation was found to be 71.1 percent which equaled 28.9 percent loss on ignition. Therefore, the weight of zeolite minus water and ammonia charged was 300 grams. To this stirred slurry, a 1 liter aqueous solution of $Pd(NH_3)_4Cl_2$ was added slowly from the dropping funnel. This salt contained 41.6 percent Pd by analysis.

A total of 3.36 grams of $Pd(NH_3)_4Cl_2$ which is equivalent to 0.5 weight percent Pd on the catalyst product was employed.

The rate of addition of the solution of $Pd(NH_3)_4Cl_2$ was 1.0 liter per hour.

When addition of the $Pd(NH_3)_4Cl_2$ solution was complete, stirring was continued for two (2) hours. The slurry was then filtered with suction. The filter material was reslurried in 2 liters of distilled water and filtered by suction. This procedure was again repeated. The filtrate, after the second washing, gave a negative test for Cl⁻ with AgNO₃ reagent. The filter material from the second washing was dried in an oven at 125° C., granulated by forcing through a U.S. Standard 20 mesh screen, and converted into tablets in a pellet press.

EXAMPLE IV

*Preparation of a 0.5 weight percent Rh loaded NH₄Y*

In a 3 liter, 3-necked flask equipped with a mechanical stirrer and dropping funnel, there was charged 422 grams of the material as prepared in Example I(a). The percent solids content of this material at the start of this preparation was found to be 71.1 percent which equaled 28.9 percent loss on ignition. Therefore, the weight of molecular sieve minus water and ammonia charged was 300 grams and 1.0 liter of distilled $H_2O$. To this stirred slurry, a 900 mls. aqueous solution of $Rh(en)_3Cl_3$ was added slowly from the dropping funnel (en means ethylenediamine). This salt contained 26.4 percent Rh by analysis.

A total of 5.6818 grams of $Rh(en)_3Cl_3$ which is equivalent to 0.5 weight percent Rh on the catalyst product was employed.

The rate of addition of the solution of $Rh(en)_3Cl_3$ was 900 mls. per 1.5 hours.

When addition of the $Rh(en)_3Cl_3$ solution was complete, stirring was continued for two (2) hours. The slurry was then filtered with suction. The filter material was reslurried in distilled water and filtered by suction. This procedure was again repeated. The filtrate, after the second washing, gave a negative test for Cl⁻ with AgNO₃ reagent. The filter material from the second washing was dried in an oven at 125° C., granulated by forcing through a U.S. Standard 20 mesh screen and converted into tablets in a pellet press.

As has been pointed out heretofore, the catalytic activity of the catalysts of this invention for hydrocarbon converting reactions is superior to the catalytic activity of the non-crystalline aluminosilicates and the crystalline metal aluminosilicates having a silica-to-alumina molar ratio of 3 or less. The superior activity in most hydrocarbon converting reactions can be beneficially utilized to conduct the reaction at a lower temperature than heretofore except in some instances wherein the prior art employed relatively large amounts of corrosive, acidic activators. It should not be inferred from this that the new catalysts must not under any circumstances have added thereto or to the reactant feed some Lewis acid type halide containing activator. When desired for special effect, activators may be employed. The benefit achieved through the addition of an activator will vary with changes in feed compositions, temperature of reaction, moisture or other impurity in the feed, and the like. In some instances such as in hydrocracking, hydroisomerization and hydrodealkylation the activation may be employed to assist in reaching stable operating conditions more quickly and easily.

The superior isomerization activity of a catalyst prepared by the present method was demonstrated by a series of tests employing as the catalyst, zeolite Y having a silicon dioxide to aluminum trioxide molar ratio of about 4.5 with 80 percent of the aluminum atoms unassociated with cations, i.e. 80% decationized, and the remaining 20 percent associated with sodium cations. The catalyst also contained 0.5 weight percent elemental platinum in the inner adsorption region, and the composition was prepared in the same general manner as outlined in Examples I and II.

In Run No. 1, the catalyst was activated in air at 500° C., cooled to room temperature and thereafter reheated to 500° C. by hydrogen gas without partial rehydration, and then contacted with the normal hexane and hydrogen feed mixture at 450 p.s.i.g. and 350° C. In the remaining Runs 2-7, the cooled air-activated catalyst was rehydrated by air exposure to contain 8.7% $H_2O$ (Runs 2-5), 15.4% $H_2O$ (Run 6) and 19.8% $H_2O$ (Run 7). The reheating rate in a hydrogen atmosphere was altered between "very slow," "slow" and "fast" in Runs 2-4, thereby permitting an empirical evaluation of this factor.

TABLE C

[Effect of rehydration on n-hexane isomerization]

| Run No. | Weight Percent H₂O on Partial Rehyd. | Rate of H₂ Reheating to 500° C. | Gas Ratio H₂:HC M:M | Mole Percent Yields at 350° C. | | | Used Catalyst | |
|---|---|---|---|---|---|---|---|---|
| | | | | i-C₆ | 2,2-DBM | Total C₆ | X-ray | B.E.T. N₂ Surface Area, m.²/g. |
| 1 | (*) | Very slow [a] | 3.5:1 | 68.3 | 9.7 | 92.6 | | |
| 2 | 8.7 | Fast [c] | 5:1 | 65.9 | 7.7 | 96.2 | Good | 387 |
| 3 | 8.7 | Slow [b] | 5:1 | 68.1 | 9.8 | 97.1 | ...do | 428 |
| 4 | 8.7 | Very slow [a] | 5:1 | 67.7 | 12.7 | 89.9 | ...do | 442 |
| 5 | 8.7 | Slow [b] | 3.5:1 | 70.2 | 12.7 | 95.3 | ...do | 423 |
| 6 | 15.4 | Very slow [a] | 3.5:1 | 66.2 | 9.6 | 96.7 | ...do | 291 |

[a] 28 hrs. to heat from room temp. to 500° C. (7 hrs. to 150° C., 16 hrs. at 150° C. and 5 hrs. to 500° C.).
[b] Same as Table B, column 10.
[c] Less than 6 hrs. to heat from room temp. to 500° C.
*None, but about 2% on activation.

The results of this test series are summarized in Table C. The conversion activities of the catalysts may be compared by inspection of the observed X-ray patterns and the surface area. That is, a highly active zeolitic molecular sieve catalyst must retain the crystallinity of the starting material as well as its high surface area. The isomerization selectivity of the catalysts may be compared on the basis of the yields of isohexane and 2,2 dimethylbutane.

It will be immediately apparent from Table C that the catalysts prepared according to this invention (Runs 3-5) are far superior isomerization catalysts to the non-partially rehydrated composition (Run 1) in terms of isomer yield. Moreover, the catalysts of Runs 3-5 are superior to the Run 2 catalyst in which the hydrogen reheating rate was excessive. Finally, the catalyst of Run 6 is inferior because the percent rehydration was excessive, resulting in loss of crystallinity.

In a preferred embodiment, an improved isomerization catalyst is prepared by providing sodium cationic zeolite Y and exchanging the sodium cations with sufficient ammonium cations so that more than 40 percent of the aluminum atoms become associated with the ammonium cations. The resulting composition is contacted with an aqueous solution of a palladium-amine complex cation thereby exchanging such cations with additional remaining sodium cations of the zeolite Y. The ammonium and palladium-amine complex cation exchanged zeolite Y is heated to above 350° C. and below the crystal destruction temperature to decompose the exchanged cations and form decationized zeolite Y containing palladium in the inner adsorption region. The resulting composition is cooled, partially rehydrated and equilibrated so as to contain between 5 and 7 weight percent water. Finally the product is reheated at an average rate of about 50° C. per hour in a hydrogen atmosphere to temperature between 500° and 600° C. The resulting composition may be contacted with paraffin hydrocarbon feedstock under isomerizing conditions to yield a highly isomerized product.

Palladium is the preferred catalytically active metal for the practice of this invention because its activity is at least comparable to the other noble metals, and it is far less expensive than platinum. One of the advantages of the instant isomerization catalyst over the presently employed catalysts is that the highly expensive platinum may be replaced with inexpensive palladium with no loss of catalytic activity or isomerization selectivity.

For maximum catalytic activity and isomerization selectively it is preferred to remove sufficient structural sodium cations from the crystalline zeolite so that less than about 20% of the aluminum atoms of the catalytically active metal-containing, non-metallic cation-containing molecular sieve are associated with sodium cations. This, of course, may be accomplished by over 80% exchange with non-metallic easily decomposable cations, but alternatively part or all of the sodium cations may be removed by a separate exchange step with polyvalent cations, e.g. calcium, strontium, barium, or the rare-earth types. The second exchange may in most instances be effected in an aqueous solution containing the dissolved polyvalent cations in the manner described in our copending application S.N. 173,321 filed February 7, 1962, now U.S. Patent No. 3,236,762 and incorporated by reference to the extent pertinent.

Another series of tests were conducted which demonstrated that high performance of this preferred isomerization catalyst along with the importance of equilibrating the catalyst with water introduced by partial rehydration. The catalyst was 87% decationized zeolite Y having a silicon dioxide to aluminum trioxide molar ratio of about 4.5 and containing 0.5 weight percent elemental palladium in the inner adsorption region. The results of these tests are summarized in Table D.

TABLE D

[Normal hexane isomerization activity of 0.5 wt. percent Pd, 87% decationized zeolite Y]

| | Run 1 | Run 2 |
|---|---|---|
| Reaction Temp., ° C. | 350 | 504 |
| Pressure, p.s.i.g | 450 | 430 |
| W.H.S.V., g./g./hr | 2.0 | 2.3 |
| H₂/HC | 5:1 | 5.1 |
| Hours on Stream | 53.5 | 44.0 |
| Liquid Yield, Vol. Percent | 99+ | 99+ |
| Liquid Analysis, Mol Percent: | | |
| n-Hexane | 27.3 | 22.6 |
| 3-methylpentane | 20.6 | 19.5 |
| 2,3-dimethylbutane | 38.7 | 33.0 |
| 2,2-dimethylbutane | 9.2 | 13.0 |
| Total hexanes | 95.8 | 91.6 |
| Yield isohexanes | 68.5 | |
| Propane | 1.5 | 1.9 |

Although each sample was air heated to 510° C. and partially rehydrated to the same 5.1 weight percent water, the Run 1 catalyst was not equilibrated. After partial rehydration the catalyst was allowed to stand 16 hours at room temperature in a closed jar prior to reheating in a hydrogen atmosphere. In contrast the Run 2 catalyst was equilibrated by heating at 80° C. in a closed jar overnight. A comparison of the 2,2-dimethylbutane yields reveals the Run 2 catalyst provides about 4 mol percent more than the Run 1 catalyst. The importance of this difference can be appreciated when one recognizes that an increase of 1 mol percent 2,2-dimethylbutane improves the Octane Rating in the isomerizate product by about 1 percent. This striking improvement was obtained despite the fact that the Run 2 isomerization temperature was 10° C. lower than the Run 1 temperature.

As previously indicated, the present catalyst may be advantageously employed to promote hydrocracking. This conversion is preferably carried out at temperatures of 150–475° C., particularly 250°–400° C., at pressures of 300–3000 p.s.i.g., particularly 400–1500 p.s.i.g., at weight-hour space velocities of 0.5–5.5, particularly 1–3, and at a hydrogen to hydrocarbon mole ratio of 5–40, particularly 10–20. Palladium and platinum are the preferred catalytically active metals for the hydrocracking process, palladium being particularly preferred.

The instant catalyst is also useful for alkylation, for example of iso-paraffins and aromatics. Typical of the feed-stocks for such a conversion process are iso $C_4$–$C_6$ paraffins plus gaseous $C_2$–$C_6$ olefins or aromatic hydrocarbons such as benzene and substituted benzenes such as phenol and chlorobenzene plus gaseous and liquid $C_2$–$C_{15}$ olefins. The alkylation process is preferably carried out at temperatures of 20–300° C., at pressures of atmospheric to 1000 p.s.i.g., particularly atmospheric to 700 p.s.i.g.

For optimum use of the instant catalyst in isomerization reaction, careful selection of the following process variables is important: (1) reaction temperature, (2) space velocity, (3) hydrogen-to-hydrocarbon ratio and, (4) reaction pressure.

With respect to temperature, the isomerization process should be carried out at a range of between 250° C. and 425° C. It is preferred, however, when isomerizing a pentane fraction, to carry out the reaction at a temperature of between 350° C. and 375° C. It is also preferred, however, when isomerizing a hexane fraction to carry out the reaction at a temperature of between 320° and 360° C. As a consequence of the closeness of the optimum isomerizing temperatures for pentane and hexane fractions, another surprising advance represented by the invention has also been found, i.e., it is now possible to isomerize mixtures of normal pentane and normal hexane fractions. In this regard, it has been discovered that the isomerization of a mixture of pentane and hexane can be effectively carried out employing the Pt or Pd-containing catalysts at a temperature of between 330° to 355° C. In this range, the effective isomerization of both the pentane and hexane fractions will result. However, it is to be understood that the higher temperature limit of the just-mentioned temperature range will more effectively isomerize the pentane fraction, but would crack a higher proportion of the hexane to gas products. While, conversely, the lower temperature limit of the temperature range will isomerize the hexane efficiently but will result in the conversion of the pentane fraction being less. Moreover, with the addition of activators of Lewis acid type halides, hydrocarbons may be isomerized at temperatures substantially lower than 250° C.

It is essential that the temperature of the isomerization not be carried out above 425° C. since undue cracking will occur. Indeed, even above 400° C. hydrocracking becomes significant and decreases the net yield of liquid product. However, butane can be effectively isomerized even at about 425° C.

A particularly good optimum temperature for isomerizing a pentane fraction has been found to be 350° C. A particularly effective isomerization temperature for hexane fraction has been found to be 330° C. A particularly effective temperature for the isomerization of a mixture of hexane and pentane fractions has been found to be 340° C. With palladium, even better activity can be achieved at a lower temperature. For example, a hexane fraction will be isomerized at a temperature of 320° C.

While isomerization of other paraffins besides normal pentane and normal hexane can be accomplished by the process of our invention, it is to be understood that isomerization of these last-named paraffins is of the utmost importance, because of their importance in gasoline upgrading.

With respect to the space velocity, the reaction should be carried out at a velocity of about 1 to 10 grams of feed per gram catalyst per hour. It is preferred, however, to carry the reaction out at a velocity of 2 to 5 grams feed per gram catalyst per hour. It has been found that as the space velocity is increased the yield of isoparaffins is decreased at a given temperature. It should be noted, however, that when the space velocity is kept constant, an increase in temperature will result in the yield of isoparaffins increasing steadily to a maximum. However, as aforementioned, after passing above the optimum temperatures set forth above, hydrocracking of the feed will increase. In this regard, the selectivity of the isomerization reaction is very high up to the optimum temperature. Above this temperature, however, the selectivity decreases.

The hydrogen-to-hydrocarbon ratio should extend from 0.3 to 1 to 10 to 1. It is preferred, however, that the hydrogen-to-hydrocarbon ratio extend from 2:1 to 5:1.

The pressure at which the isomerization reaction of this invention is carried out should extend from about 100 to about 1000 p.s.i.g. It is preferred, however, that the pressure of the reaction range from about 350 to about 600 p.s.i.g. At constant contact time the reaction appears to be favored by lower pressures. At low reaction temperatures the selectivity of the catalyst does not appear to be affected by the total reaction pressure. However, if the reaction temperature is increased above the optimum some hydrocracking will result. In this case higher operating pressures have been found to reduce the amount of this hydrocracking.

As indicated, heretofore, the invention has several advantageous features over those processes found in the prior art. Foremost among the advantages is the quality of the product itself. In this regard, the amount of isomers produced by the process has been found to closely approach the equilibrium in all normal paraffin to isomeric-paraffin relationships. The amount of 2,2-dimethylbutane contained in the hexane isomerizate formed by the process has been found to be more than 13 mol percent. This represents a decided advance in the art since heretofore the highest amount of 2,2-dimethylbutane achieved using other noble-metal type catalysts was about 10.5 mol percent. This isomer, i.e., 2,2-dimethylbutane, is among the most important of all the isomers formed in the reforming of straight-run gasoline fractions. Hence, a 13 and greater percent yield of this isomer represents a real contribution to the art.

Another advantageous feature resulting from the process is the fact that the corrosive activators formerly employed in all the known prior art processes need not now be employed.

A third advantageous feature of our process is that as a result of the fact that corrosive activators are not required, the feed of hydrocarbons need not be specially dried prior to contacting the same with the novel catalyst of our invention.

A still further advantage, is that the optimum isomerization temperatures are generally lower than those temperatures found in the prior art. In addition, the optimal isomerization temperature for the pentane and hexane fraction is very close, i.e., only 10 to 15° C. apart. As aforementioned, this factor enables a mixture of the pentane and hexane fraction to be isomerized simultaneously.

For catalyzing the reforming of hydrocarbons, a process temperature range of 300° to 600° C. is suitable and 400° C. to 525° C. is preferred. The pressure should be in the range of 100 to 1200 p.s.i.g. more particularly 300–600 p.s.i.g., and the hydrogen-to-hydrocarbon feed mole ratio should be from 1:1 to 20:1 and more particularly 2:1 to 5:1. The contact time expressed as weight hourly space velocity WHSV, should be 0.1 to about 7 and more particularly from 0.5 to 3.

The aim of the cracking processes including catalytic cracking and hydrocracking is to produce gasoline from hydrocarbon fractions boiling above the gasoline range. In a few cases the product desired is a specific gaseous hydrocarbon compound such as ethylene, propylene, and the like.

The conventional catalytic cracking process is carried out at almost atmospheric pressure (8–20 p.s.i.g.) at 470–510° C. on fluid or moving catalyst beds. In once-through operation only 55–60 percent gasoline-containing product is produced. Therefore, the unconverted fraction boiling above 200° C. has to be recycled.

The prior art catalytic cracking catalysts split the large hydrocarbon molecules and also isomerize the split small molecules. They do not isomerize, however, the feed components. The lack of activity in isomerizing the paraffin hydrocarbons without splitting the C—C bond is characteristic of all known catalytic cracking catalysts. This property is disadvantageous, however, since the isoparaffins can be cracked more easily. Due to the lack of isomerization activity for the feed components, the feed is degraded by dehydrogenation and thermal cracking during the cracking process. Since, in once-through operation, only 55–60% of the heavy boiling feed is converted, recycle operation is used to increase the gasoline yield. Because of the degradation of the feed and the build-up of the aromatic content, however, a substantial quantity of the recycled oil cannot be further cracked and has to be disposed of as cheap by-product.

The process conditions for the cracking reaction using the instant catalyst are:

|  | Broad Range | Preferred Range |
| --- | --- | --- |
| Temperature, °C | 200–600 | 250–450 |
| Pressure, p.s.i.g | 0–200 | 0–20 |
| Space velocity, g./g./hr | 0.5–5 | 1–2 |

Although certain embodiments have been described in detail, it will be appreciated that other embodiments are contemplated along with modifications of the disclosed features, as being within the scope of the invention.

What is claimed is:

1. A method for preparing an improved hydrocarbon conversion catalyst comprising the steps of:

(a) providing a metal cation-containing zeolitic molecular sieve composition having a crystalline structure capable of internally adsorbing benzene and a silicon dioxide to aluminum trioxide molar ratio greater than 3.0;

(b) exchanging cations of said molecular sieve composition with sufficient non-metallic, easily decomposable cations so that more than 40 percent of the aluminum atoms become associated with such non-metallic cations;

(c) introducing a catalytically active metal to the molecular sieve composition;

(d) heating the catalytically active metal-containing, non-metallic cation-containing molecular sieve composition to temperature above 350° C. and below the crystal destruction temperature to decompose said non-metallic cations and form a decationized molecular sieve;

(e) cooling, partially rehydrating and equilibrating the decationized molecular sieve composition from step (d) so as to contain between 3 and 10 weight percent water; and (f) slowly reheating the partially rehydrated and equilibrated decationized molecular sieve composition to temperature between 300° C. and 700° C. and for sufficient duration to reduce the water loading of such composition.

2. A method according to claim 1 in which the molecular sieve is zeolite Y.

3. A method according to claim 1 in which less than about 20% of the aluminum atoms of the catalytically active metal-containing, non-metallic cation-containing molecular sieve are associated with sodium cations.

4. A method according to claim 1 in which less than about 20% of the aluminum atoms of the catalytically active metal-containing, non-metallic cation-containing molecular sieve composition are associated with sodium cations and the balance of aluminum atoms not associated with non-metallic cations are associated with polyvalent cations.

5. A method according to claim 1 in which the catalytically active metal is in the inner adsorption region of the molecular sieve.

6. A method according to claim 1 in which heating step (d) is performed in an oxygen-containing atmosphere.

7. A method according to claim 1 in which the partially rehydrated decationized molecular sieve composition is equilibrated by storing same in a sealed atmosphere until the water is substantially uniformly distributed through the composition.

8. A method according to claim 1 in which the partially rehydrated decationized molecular sieve composition is equilibrated by heating until the water is substantially uniformly distributed through the composition.

9. A method according to claim 1 in which the decationized molecular sieve composition is partially rehydrated and equilibrated by contacting was gas containing sufficient water for adsorption to establish equilibrium with said composition in the 3–10 weight percent water range.

10. A method according to claim 1 in which the partially rehydrated and equilibrated decationized molecular sieve composition is heated to about 500° C.

11. A method according to claim 1 in which the partially rehydrated and equilibrated decationized molecular sieve composition is reheated in step (e) at a rate less than 75° C. per hour.

12. A method according to claim 1 in which the partially rehydrated and equilibrated decationized molecular sieve composition is reheated in step (e) at an average rate of 50° C. per hour.

13. A method according to claim 1 in which the partially rehydrated and equilibrated decationized molecular sieve composition is reheated in a hydrogen atmosphere.

14. A method for preparing an improved isomerization catalyst comprising the steps of:
(a) providing sodium cationic zeolite Y;
(b) exchanging the sodium cations of said zeolite Y with sufficient ammonium cations so that more than 40 percent of the aluminum atoms become associated with such ammonium cations;
(c) contacting the ammonium cation exchanged zeolite Y with an aqueous solution of a palladium-amine complex cation thereby exchanging such cation with the sodium cations of said zeolite Y;
(d) heating the ammonium and palladium-amine complex cation exchanged zeolite Y to temperature above 350° C. and below the crystal destruction temperature to decompose the exchanged cations and form decationized zeolite Y containing palladium in the inner adsorption region;
(e) cooling, partially rehydrating and equilibrating the zeolite Y from step (d) so as to contain between 5 and 7 weight percent water; and
(f) reheating the partially rehydrated and equilibrated decationized zeolite Y at an average rate of about 50° C. per hour in a hydrogen atmosphere to temperature between 500 and 600° C.

15. A method according to claim 1 in which the partially rehydrated and equilibrated decationized molecular sieve composition is slowly reheated in step (f) for sufficient duration to reduce the water loading of such composition below 2½ weight percent.

References Cited

UNITED STATES PATENTS

| 3,130,006 | 4/1964 | Rabo et al. | 23—110 |
| 3,200,082 | 8/1965 | Breck et al. | 252—455 |
| 3,201,356 | 8/1965 | Kress et al. | 252—455 |
| 3,236,761 | 2/1966 | Rabo et al. | 208—111 |

DANIEL E. WYMAN, *Primary Examiner.*

C. F. DEES, *Assistant Examiner.*